United States Patent [19]
Kono et al.

[11] Patent Number: 5,296,017
[45] Date of Patent: Mar. 22, 1994

[54] METHOD AND APPARATUS FOR CONCENTRATING CHLORINE GAS

[75] Inventors: Yoshitsugu Kono; Masaaki Ura; Hiroyuki Itoh; Satoshi Tsuruda, all of Omuta, Japan

[73] Assignee: Mitsui Toatsu Chemicals, Inc., Tokyo, Japan

[21] Appl. No.: 888,360

[22] Filed: May 27, 1992

[30] Foreign Application Priority Data

| May 28, 1991 | [JP] | Japan | 3-121682 |
| May 28, 1991 | [JP] | Japan | 3-121688 |
| Jun. 7, 1991 | [JP] | Japan | 3-136385 |
| Jun. 19, 1991 | [JP] | Japan | 3-147486 |
| Aug. 14, 1991 | [JP] | Japan | 3-204291 |

[51] Int. Cl.⁵ .......................... B01D 53/04
[52] U.S. Cl. .......................... 95/14; 95/92; 95/101; 95/117; 95/132; 96/112; 96/130; 96/133
[58] Field of Search ............ 55/20, 25, 26, 29, 31-33, 55/58, 62, 71, 74, 75, 161-163, 179, 387, 389

[56] References Cited

U.S. PATENT DOCUMENTS

| 1,617,305 | 2/1927 | Guyer et al. | 55/71 X |
| 2,333,748 | 11/1943 | Sperry | 55/71 |
| 2,786,816 | 3/1957 | Guerin | 55/33 X |
| 2,800,197 | 7/1957 | Wynkoop | 55/71 X |
| 2,910,140 | 10/1959 | Bencker et al. | 55/29 |
| 3,001,607 | 9/1961 | Eng et al. | 55/71 X |
| 3,029,575 | 4/1962 | Eng et al. | 55/71 X |
| 3,201,201 | 8/1965 | Van Dijk et al. | 55/31 X |
| 3,283,476 | 11/1966 | Honigh | 55/71 X |
| 3,308,606 | 3/1967 | Hagbarth | 55/29 |
| 3,714,040 | 1/1973 | Jordan et al. | 55/71 X |
| 4,218,224 | 8/1980 | Sun | 55/20 |
| 4,299,596 | 11/1981 | Benkmann | 55/26 |
| 4,350,501 | 9/1982 | Bannon | 55/26 |
| 4,404,004 | 9/1983 | Knoblanch et al. | 55/25 |
| 4,832,711 | 5/1989 | Christel, Jr. et al. | 55/20 |
| 4,941,894 | 7/1990 | Black | 55/20 |

FOREIGN PATENT DOCUMENTS

| 2032911 | 1/1971 | Fed. Rep. of Germany | 55/71 |
| 129520 | 1/1978 | German Democratic Rep. | 55/20 |
| 61-053555 | 3/1986 | Japan | 55/20 |
| 61-197018 | 9/1986 | Japan | 55/20 |
| 63-270522 | 11/1988 | Japan | 55/20 |
| 3-177301 | 8/1991 | Japan | 55/29 |
| WO91/08824 | 6/1991 | PCT Int'l Appl. | 55/71 |
| 1510897 | 9/1989 | U.S.S.R. | 55/20 |
| 1444231 | 7/1976 | United Kingdom | 55/26 |

*Primary Examiner*—Robert Spitzer
*Attorney, Agent, or Firm*—Millen, White, Zelano & Branigan

[57] ABSTRACT

A method and an apparatus for concentrating/purifying a chlorine gas are disclosed in which a pressure swing adsorption method for alternately repeating an adsorbing operation and a desorbing operation employing one or more adsorption towers packed with an adsorbent for adsorbing the chlorine gas are used to obtain a high-purity concentrated/purified chlorine gas and an exhaust gas containing virtually no chlorine gas is obtained from the chlorine gas containing impurities by terminating the adsorption operation when the rate of temperature rise near the outlet end of an adsorption tower due to adsorption of chlorine therein rises above a predetermined amount.

18 Claims, 4 Drawing Sheets

MATERIAL FEED RATE  2.0 Nm/h
CHLORINE CONCENTRATION IN MATERIAL  15vol%
TEMPERATURE MEASUREMENT POSITION
A POSITON SEPARATED AS MUCH AS 1/10 (20cm)
FROM THE UPPER PORTION OF AN ADSORBING TOWER

METHOD AND APPARATUS FOR CONCENTRATING CHLORINE GAS

BACKGROUND OF THE INVENTION (i) Field of the Invention

The present invention relates to a method for concentrating (purifying) a chlorine gas by the utilization of a pressure swing adsorption method (hereinafter referred to as "PSA method"), and particularly, it relates to a method and an apparatus for concentrating/purifying a chlorine containing gas so as to lower the chlorine concentration in a treated exhaust or residue gas and increase the purity of a (concentrated) chlorine gas product.

(ii) Description of the Related Art

As methods for concentrating a chlorine gas which have been heretofore known, there are a method which comprises absorbing the chlorine gas by a chlorine-containing organic solvent, and then vaporizing the chlorine gas; a method which comprises pressurizing/cooling a gas, and then separating the resultant liquid chlorine; a method which comprises adsorbing chlorine by silica gel (U.S. Pat. No. 1,617,305); and other techniques. However the method using a chlorine-containing solvent is not preferable, because the chlorine solvent has an influence on process parameters and hence the use of chlorine as a solvent will be restricted. On the other hand, the method which comprises pressurizing/cooling the chlorine gas to liquefy it requires a compressor and a freezer and therefore this method is not considered to be an advantageous technique. The method which comprises adsorbing chlorine by silica gel is also poor in efficiency and it is not an industrially effective technique. Therefore, this method has not been utilized so far. In particular, there have not been any industrially effective method and apparatus by which gases having low chlorine concentration can be converted to gases with a high concentration are concentrated without leaking the chlorine gas into an exhaust or residue gas.

As is apparent from the foregoing, a method and apparatus have not been developed thus far which provides an industrially effective process for concentrating/purifying a chlorine gas which contains impurities.

Furthermore, there has not existed a method for separating chlorine from a mixed gas containing the chlorine gas, particularly from a gas having a relatively low chlorine concentration and containing moisture to concentrate the chlorine.

SUMMARY OF THE INVENTION

An object of the present invention is to provide an industrial method and apparatus by which a chlorine gas containing impurities can be concentrated/purified to obtain high-purity chlorine without using any solvent and without requiring the liquefaction of chlorine and by which a substantially chlorine-free treated exhaust gas can be discharged.

Another object of the present invention is to provide a pressure swing adsorption (PSA) method and apparatus which comprise separating chlorine from a gas containing chlorine to concentrate the chlorine and to thereby decrease the chlorine content in the remaining gas (treated waste gas) to substantially zero, the method being characterized in that operation conditions for decreasing a chlorine concentration in the remaining gas to substantially zero ar automatically controlled.

Usually, in the PSA system, the operation conditions are selected by calculating an adsorption cycle and a desorption cycle on the basis of the amount of an adsorbent with which plural adsorption towers are packed, the adsorption performance of the towers, the amount of adsorbed components in the treated gas, the amount of the gas and the operating time. In this method, however, the actual operation conditions deviate from the optimum operation conditions owing to the deterioration of the adsorbent with time and the alteration of treatment conditions (temperature, pressure, flow rate and the like). In particular, selecting treatment conditions which will decrease the specific gas concentration in the residue gas to substantially zero has been difficult.

The present inventors have invented a method for separating chlorine from a gas containing chlorine to concentrate it by the PSA method. When the operation conditions are suitably selected in this method, chlorine can be separated from the gas containing chlorine and concentrated, so that the chlorine concentration in the residue gas can be reduced to substantially zero. However, also in this method, the actual operation conditions deviate from the optimum operation conditions owing to the deterioration of the adsorbent with time and the alteration of treatment conditions (temperature, pressure, flow rate and the like). For this reason, a long operation which will decrease the chlorine gas concentration in the remaining gas to substantially zero is very difficult to achieve.

Still another object of the present invention is to provide an industrial apparatus which can maintain the life of the adsorbent for a long period of time and which can prevent the corrosion of the apparatus itself without using any solvent and without requiring the liquefaction of chlorine in the case that chlorine is separated from a gas having a relatively low chlorine concentration and containing moisture.

Figure 1:
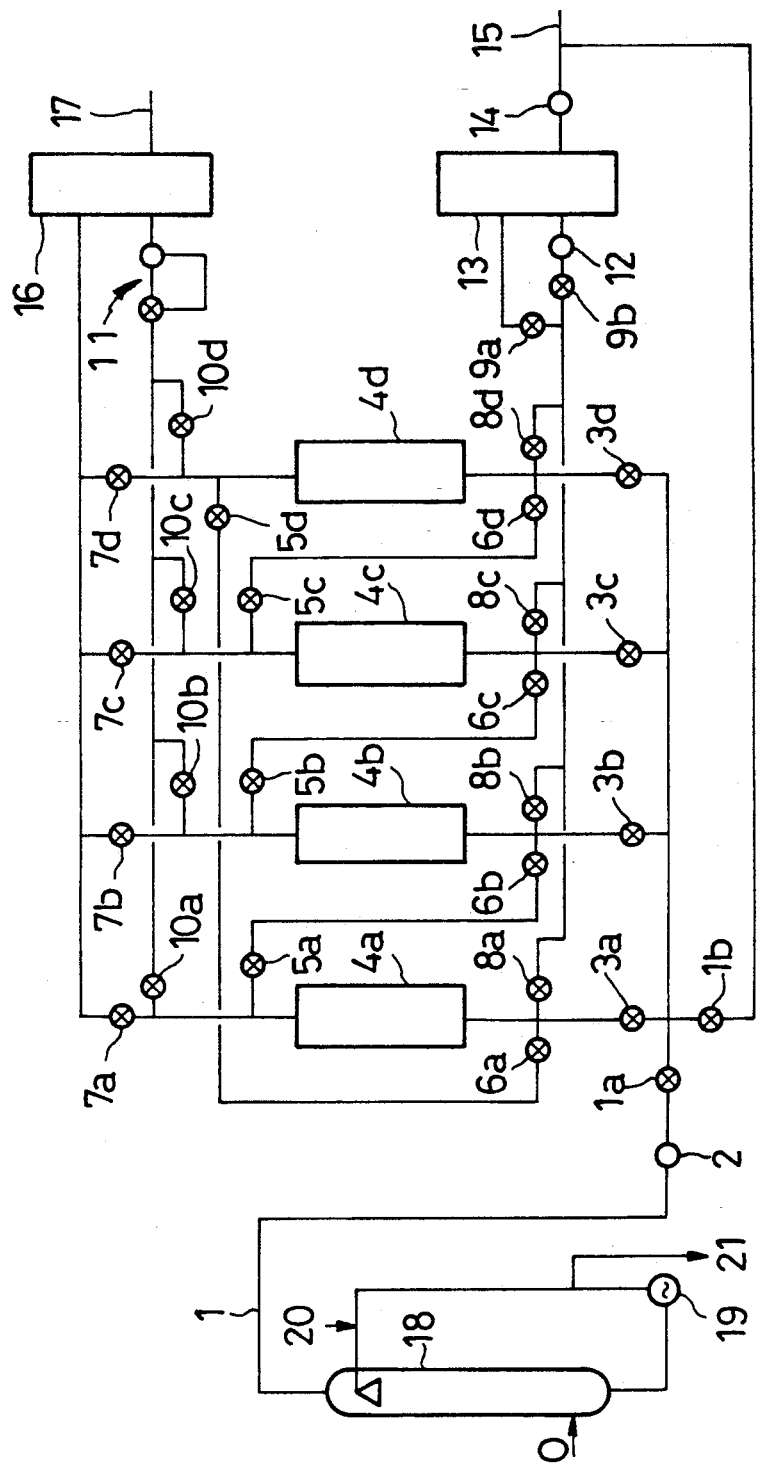
FIGS. 1 and 2 are diagrams of examples of PSA apparatuses by which the present invention is practiced.

The symbols in FIG. 1 mean:

0, 1 . . . Material gas receiving pipe
2 . . . Compressor for a material gas
3a, b, c, d . . . Switch valve for receiving the material gas
4a, b, c, d . . . Chlorine gas adsorbing tower
5a, b, c, d . . . Switch valve for discharging a treated gas
6a, b, c, d . . . Switch valve for receiving the treated gas
7a, b, c, d . . . Switch valve for discharging the treated gas
8a, b, c, d . . . Switch valve for discharging a product gas
9a, b . . . Switch valve for discharging the product gas
10a, b, c, d . . . Switch valve for receiving a pressurized gas 11 ... Pressure adjusting mechanism
12 ... Vacuum pump
13 ... Product tank
14 ... Compressor for the product gas
15 ... Product gas discharging pipe
16 ... Buffer tank
17 ... Treated gas discharging pipe
18 ... Dehydrating tower
19 ... Pump
20 ... Sulfuric acid feeding pipe
21 ... Sulfuric acid discharging pipe
Explanation of symbols in FIG. 2.
(1), (2) ... Adsorption tower
(3) ... Compressor for a gas containing chlorine
(4) ... Adsorption pressure controlling device
(5) ... Vacuum pump
(6), (7), (8), (9), (10), (11) ... Switch valve
(12), (13) ... Thermo-couple
(14) ... Amplifier
(15) ... Calculation controller
(16) ... Output portion
(17) ... Electromagnetic valve

DETAILED DESCRIPTION OF THE INVENTION

The present invention is directed to a method for concentrating a chlorine gas which comprises repeating an adsorbing operation, in which a chlorine gas containing impurities is fed to an adsorption tower packed with an adsorbent for adsorbing the chlorine gas, and a desorbing operation, in which the chlorine gas adsorbed by the adsorbent is desorbed, to remove the impurities from the chlorine gas containing the impurities fed to the adsorbing tower and to thereby obtain a high-purity chlorine gas and a residue gas; the method comprises the treated gas coming from a first adsorption tower is introduced into a second adsorption tower to remove most of chlorine from the exhaust gas and, prior to the desorbing operation, the product chlorine gas is introduced into the adsorbing tower to purge a gas residue from the system, thereby heightening the purity of the product chlorine gas.

The first adsorption tower can be directly connected to the second adsorption tower to feed a material gas (a gas to be treated) to the first adsorption tower until breakthough of chlorine gas from the adsorbent occurs. In the second adsorption tower, the chlorine gas leaked from the first adsorption tower can be completely adsorbed.

Furthermore, the product chlorine gas can be introduced into the adsorption tower prior to the desorbing operation to purge the residue gas having a low purity from the adsorbing tower. As a result, the purity of the product chlorine gas can be heightened, and a substantially chlorine-free treated exhaust gas can be discharged.

Intensive investigation has been made of the technique of automatically setting operating conditions under which the chlorine concentration in a remaining gas can be reduced to substantially zero in a PSA method for separating chlorine from a gas containing chlorine to concentrate chlorine. As a result, it has been found that the automatic control can be achieved by continuously measuring a temperature change (a temperature rise) of an adsorbent (an adsorbent-packed layer) in the vicinity of the outlet of an adsorption tower, and the present invention has been attained on the basis of this knowledge.

That is, the present invention is directed to a method for adsorbing/removing chlorine from a gas stream by the use of the pressure swing adsorption method in which a plurality of adsorption towers packed with an adsorbent capable of adsorbing chlorine are employed, the method comprising the steps of continuously detecting chlorine by a sensor for detecting the presence of the chlorine gas to recognize the completion of the adsorbing operation, whereupon the feed of the chlorine gas containing impurities to the adsorption tower is stopped and the adsorption tower is changed from the adsorbing operation to the desorbing operation, and especially measuring a temperature change of the adsorbent (an adsorbent-packed layer) in the vicinity of the outlet of the treated exhaust gas in the adsorption tower, stopping the feed of the gas to be treated to the adsorbing tower, when a differential value of the adsorbent temperature has reached a predetermined value, and then beginning a desorbing/regeneration operation of the adsorbing tower. In addition, the present invention is also directed to an adsorption apparatus for the practice of the above-described method.

The gas containing chlorine which can be used in the method of the present invention can contain gases such as oxygen, nitrogen, carbon dioxide, carbon monoxide, argon and methane, in addition to chlorine. In order to separate chlorine from these gases by the PSA method, it is necessary to select an adsorbent which has a sufficient gap between its adsorption affinity for these gases and its adsorption affinity for chlorine and which adsorbs the chlorine with a heat of adsorption, which exceeds that of each of the other gases. Thus, examples of the adsorbent for chlorine which can be used in the present invention include zeolites, non-zeolite type porous acidic oxides, active carbon and molecular sieve carbon.

There is no particular restriction is on the chlorine concentration of the gas containing chlorine which can be used in the method of the present invention, but it is usually from 5 to 98% by volume.

In order to measure the temperature change of the adsorbent in accordance with the present invention, it is preferred that the temperature of the adsorbent is measured at a position of ½ or less of the total height of the packed adsorbent from the tip of the adsorbent present at the gas outlet of the treated exhaust gas during the adsorbing operation.

In general, when the adsorption/separation of a specific chlorine gas is carried out in accordance with the PSA method, it is known that the adsorption heat which is generated raises the temperature of the adsorbent. The present inventors have measured the temperature change of the adsorbent which occurs as a result of the gas containing chlorine being adsorbed on zeolite, non-zeolite type porous acidic oxide, active carbon or molecular sieve carbon as the adsorbent and, as a result, it has been confirmed that the heat of adsorption of chlorine is much larger than that of each of the other gas components. Furthermore, it has been also confirmed that the site of the adsorbent-packed layer where an abrupt temperature rise in the adsorbent occurs approximately corresponds to a site where the adsorption of the chlorine gas is occurring.

The rate of temperature change of the heat of adsorbent due to the adsorption of the gas containing chlorine depends upon the chlorine concentration in the material gas (the gas to be treated), i.e., the higher the chlorine concentration, the larger per unit time is the temperature rise as a result of its adsorption. Therefore, the leakage of chlorine into the residue gas can be inhibited by appropriate selection of the differential value of the temperature change of the adsorbent due to the heat of adsorption at the certain chlorine concentration in the material gas and the detection site for measuring the temperature change.

Figure 4:
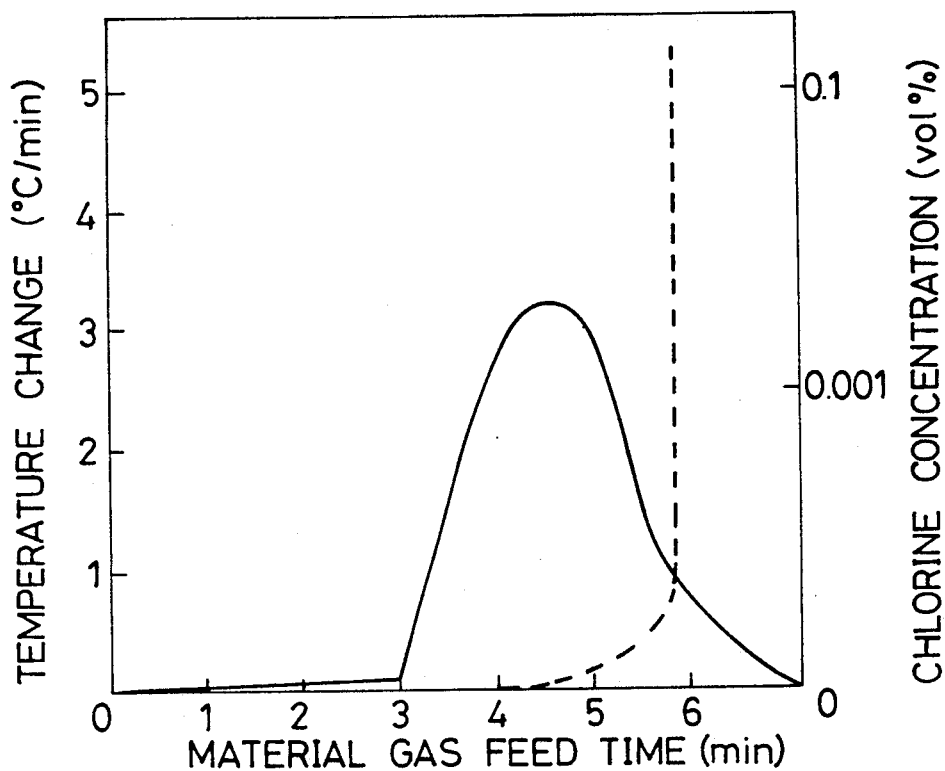
FIG. 4 is a graph showing the relation of a temperature rise to the chlorine concentration in a remaining gas.

FIG. 4 shows the relation between the temperature change of the adsorption heat in the case that the material gas having a chlorine concentration of 15% by volume is used and the chlorine concentration in the residue gas. As is apparent from FIG. 4, in order to prevent chlorine from leaking from the adsorbent back into the residue gas in the case of a material gas having a chlorine concentration of 15% by volume and the measurement site of the temperature change is specified, a gas introducing valve should be switched at the time when the differential value of the temperature change due to the adsorption heat has reached 1.5° C./minute (a predetermined value).

Accordingly, the temperature change of the adsorbent in the upper portion of the adsorbing tower can be continuously measured (monitored), and immediately when the adsorption heat of chlorine has been detected, i.e., immediately when the differential value of the temperature change has reached the predetermined value, an automatic valve can be automatically switched from the adsorbing operation to completely inhibit chlorine from leaking into the remaining gas. That is, if the temperature change is measured by a thermocouple or another means disposed in the adsorbent in the upper portion of the adsorbing tower, the adsorption of chlorine can be easily detected. This detection can be carried out on the basis of the differential change of the temperature so as not to be affected by the inlet temperature of the gas containing the chlorine gas and the like, and suitable means can be employed in accordance with the above-mentioned result to determine the time of termination of the adsorbing operation. Simultaneously, the result can be converted into an electrical output to switch the automatic valve for changing the operation of the adsorbing tower.

That is, according to the present invention, the temperature change of the adsorbent in the upper portion of the adsorbing tower can be continuously measured (monitored) by an inexpensive temperature measuring means, and when the differential value of the temperature rise has reached a predetermined value, the adsorbing operation is automatically switched, whereby a chlorine concentration in the residue gas can be reduced to zero. Since the chlorine concentration in the residue gas is substantially zero, measures for avoiding the adverse effects of chlorine can be simplified. Therefore, the present invention is very useful from an industrial viewpoint.

In the present invention, a dehydrator may be equipped in order to remove moisture from a starting mixed gas containing the chlorine gas on the upstream side of the adsorbing tower in a chlorine gas concentrating/purifying apparatus in which the above-mentioned PSA method is utilized.

When the dehydrator is equipped in order to remove moisture from the mixed gas containing the chlorine gas, the life of the adsorbent can be prolonged and corrosion of the apparatus can be also prevented.

Now, the present invention will be described in detail in reference to examples, but the scope of the present invention should not be limited to these examples.

EXAMPLE 1

FIG. 1 shows one example of a chlorine gas purifying device of the present invention.

A pipe 1 is employed as a material gas introducing pipe, and a gas having a relatively low chlorine purity is introduced into pipe 1, pressurized to a predetermined pressure by means of a compressor 2, and then introduced into a first tower 4a of four adsorption towers 4a, 4b, 4c and 4d via a switch valve 3a.

The four towers 4a, 4b, 4c and 4d are packed with an adsorbent for predominantly adsorbing chlorine, for example, a synthetic or natural zeolite, a non-zeolite type porous acidic oxide, active carbon or molecular sieve carbon, and chlorine in the material gas introduced while pressured is predominantly adsorbed by the adsorbent. After a predetermined amount of the material gas has been introduced, the product chlorine gas pressurized by a compressor 14 is introduced into tower 4a by switching switch valves 1a, 1b to purge the material gas off tower 4a.

The gas stream having a lowered chlorine concentration coming from the outlet of tower 4a is introduced into second tower 4b via switch valves 5a, 6b. The treated gas from which residual chlorine has been removed by adsorption in second tower 4b is discharged through a switch valve 7b. At this time, a part of the gas discharged from the second tower 4b is introduced into third tower 4c via a flow rate adjusting mechanism 11 and a switch valve 10c, and a pressure filling step is then carried out to increase the pressure in this tower.

In the fourth tower 4d, desorption is carried out under atmospheric pressure by switching a switch valve 8d. Fourth tower 4d is further connected to a vacuum pump 12 via a switch valve 9b, and in fourth tower 4d, the concentrated chlorine gas is recovered and the adsorbent is regenerated (desorbed). After tower 4a has adsorbed a predetermined amount of chlorine and has been purged with the product gas, the introduction of the gas thereinto is stopped by switching a switch valve 3a, and the pressure in the tower is reduced by switching a switch valve 8a and the tower is further evacuated to a reduced pressure state by a vacuum pump 12, whereby chlorine is desorbed from the adsorbent to regenerate the same. In this reproduction step, the chlorine gas product having a high purity can be stored in a buffer tank 13, pressurized by the compressor 14, and then obtained through a product discharge pipe 15.

At this time, the material gas is introduced into second tower 4b via a switch valve 3b, and chlorine in the material gas is predominantly adsorbed. The gas having a low chlorine concentration is obtained through the outlet of tower 4b and is then introduced into tower 4c via switch valves 5b, 6c. In tower 4c, residual chlorine is adsorbed, and the chlorine-free gas is then discharged through a switch valve 7c. After the adsorption of the material gas has been computed, the product chlorine gas pressurized by compressor 14 is introduced into the tower 4b by switching the switch valves 1a, 1b to purge the material gas off tower 4b, and the purged gas is discharged through the switch valves 5b, 6c and then introduced into third tower 4c. In third tower 4c, chlorine is adsorbed, and the gas is then discharged through the switch valve 7c.

Furthermore, a part of the gas discharged from third tower 4c is introduced into fourth tower 4d via the flow rate adjusting mechanism 11 and a switch valve 10d, and a pressure filling step is then carried out to increase the pressure in this tower.

Afterward, the material gas is introduced into third tower 4c via a switch valve 3c, and then chlorine in the material gas is predominantly adsorbed. At the outlet of tower 4c, the gas having a low chlorine concentration is obtained, and then introduced into tower 4d via switch valves 5c, 6d.

Simultaneously, a part of the gas discharged from the fourth tower 4d is introduced into the first adsorbing tower 4a via the flow rate adjusting mechanism 11 and a switch valve 7a, and a pressure filling step is then carried out to increase the pressure in this tower.

The introduction of the material gas and the purged gas into second tower 4b is stopped by switching the switch valve 3b, and the pressure in this tower is then reduced by switching a switch valve 8b. Furthermore, second tower 4b is evacuated to a reduced pressure state by switching a switch valve 9b and by means of a vacuum pump 12, whereby chlorine is desorbed from the adsorbent to recover it.

Similarly, the above-mentioned serial operation is repeated alternately by the use of four towers 4a, 4b, 4c and 4d, whereby high-purity chlorine can be continuously prepared from the chlorine gas containing impurities.

EXAMPLE 2

One example of an apparatus by which the method of the present invention can be carried out will be described in reference to drawings as follows.

Figure 2:
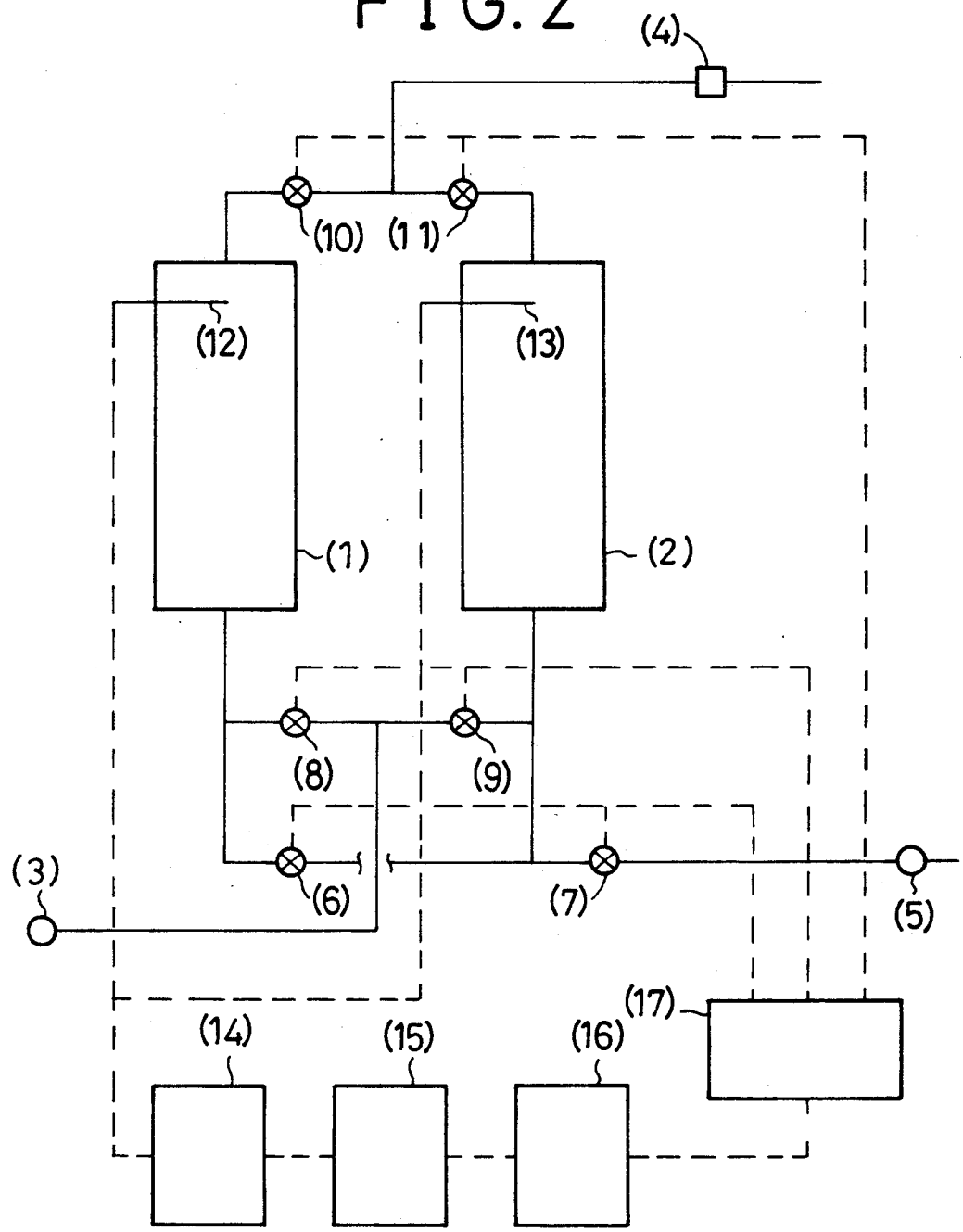

In FIG. 2, reference numerals (1) and (2) are adsorbing towers packed with an adsorbent, numeral (3) is a compressor for a gas containing chlorine, (4) is an adsorption pressure control device, (5) is a vacuum pump for desorption/regeneration, and (6) to (11) are switch valves.

Assuming that an adsorption operation is carried out in adsorbing tower (1) and a desorption/regeneration operation is performed in adsorption tower (2), the switch valves (7), (8) and (10) are opened and switch valves (6), (9) and (11) are closed. A gas containing chlorine from compressor (3) is fed to adsorbing tower (1) through the bottom thereof via switch valve (8), and chlorine is mainly adsorbed therein. The chlorine-free gas is then discharged as a residue gas from adsorbing tower (1) through the upper portion thereof and further eliminated from the system through switch valve (10).

On the other hand, in adsorbing tower (2), the adsorbed components, of which chlorine is the main component, are desorbed from the adsorbent by the use of a vacuum pump, and the chlorine gas is then discharged from adsorbing tower (2) through the bottom thereof and thereafter from the system through switch valve (7) by vacuum pump (5). This discharged gas is the gas containing concentrated chlorine, and it can be treated in another step or the like.

In a conventional apparatus, switch valves are switched in accordance with a given design by a timer or other means, but when chlorine concentration, temperature, pressure and the like of a gas containing chlorine change, it is difficult to conduct such an operation as to decrease a chlorine concentration in a residue gas to substantially zero over a long period of time.

On the contrary, in the present invention, the temperature of the adsorbent in the adsorption tower can be continuously measured (monitored) to detect the differential change at an optional temperature, whereby an optional adsorption time can be selected and after the adsorption, the adsorption tower can be switched to the desorbing operation.

In the practice of the present invention, thermocouples (12), (13) are disposed in the upper portion of adsorption towers (1), (2) of the above-mentioned apparatus, and the temperature change of the adsorbent is continuously detected so as to output an electrical signal. This output electrical signal is input into an amplifier (14), and the amplified electrical signal is then input into a calculation controller (15), in which a differential change of the temperature is calculated. When the differential change of the temperature which more than a predetermined differential change at a selected temperature is detected by calculator (15), the above-mentioned electrical signal is input into an output portion (16), which controls the switch of an electromagnetic valve (17) to switch switch valves (6) to (11).

The gist of the present invention resides in that the adsorbing step in the PSA method is monitored so that the chlorine concentration in the remaining gas is always substantially zero, even if a gas treatment conditions for the gas containing chlorine (composition, flow rate, pressure temperature) changes.

That is, when the gas containing chlorine is passed through the adsorbing tower to adsorb chlorine by the adsorbent, the temperature of the adsorbent rises owing to the heat of, adsorption, and in the tower, a temperature rise zone advances along the tower substantially proportionately to the advancement of the chlorine adsorption zone in the tower. Therefore, when this temperature rise zone is detected in the vicinity of the outlet of the tower, the detected values can be utilized to correctly predict the chlorine breakthrough time, which permits monitoring the set switch time of the tower. However, the mere detection of the temperature rise is an insufficient monitor owing to a dependent relationship which it has with the inlet temperature of the gas containing chlorine. The accurate monitor for determining the time of termination of the adsorbing step in a tower can be achieved by determining the differential change in the temperature.

The present invention is effective in the case that the heat of adsorption by the adsorption of the chlorine gas by the adsorbent is much larger than the heat of adsorption of another gas thereby. Examples of the adsorbent having such characteristics include zeolites, non-zeolite type porous acidic oxides, active carbon and molecular sieve carbon.

According to a PSA method for recovering chlorine from the gas containing chlorine to concentrate chlorine which is concerned with the method of the present invention, the operation by which the chlorine concentration in the remaining gas is always reduced to substantially zero can be achieved over a long period of time. In addition, the monitoring can be carried out so as to prevent chlorine from leaking into the residue gas. Therefore, the present invention has high reliability and is very effective from an industrial viewpoint.

EXAMPLE 3

In a dual-adsorption type PSA apparatus for separating chlorine from a gas containing chlorine used in the example to concentrate chlorine, each adsorption tower is made of a pressure-resistant steel pipe having a diameter of 50 mm and a height of 2000 mm, and a Y type zeolite (Zeochem Co., Ltd.) is used as an adsorbent and each adsorption tower is packed with 3 kg of the adsorbent. The gas containing chlorine used in the example is composed of 15% by volume of chlorine, 50% by volume weight of oxygen, 15% by volume of nitrogen and 20% by volume of carbon dioxide, and this gas is fed at a flow rate of 2 Nm$^3$/h by the use of a compressor (3) shown in FIG. 2. In this case, adsorption pressure can be optionally set in the range of 1 to 7 kg/cm$^2$ gauge pressure by a pressure control device (4). For the accomplishment of the adsorption pressure, a vacuum pump (5) having a maximum power by which a vacuum degree of 100 torr can be reached in 3 minutes is selected and used.

Figure 3:
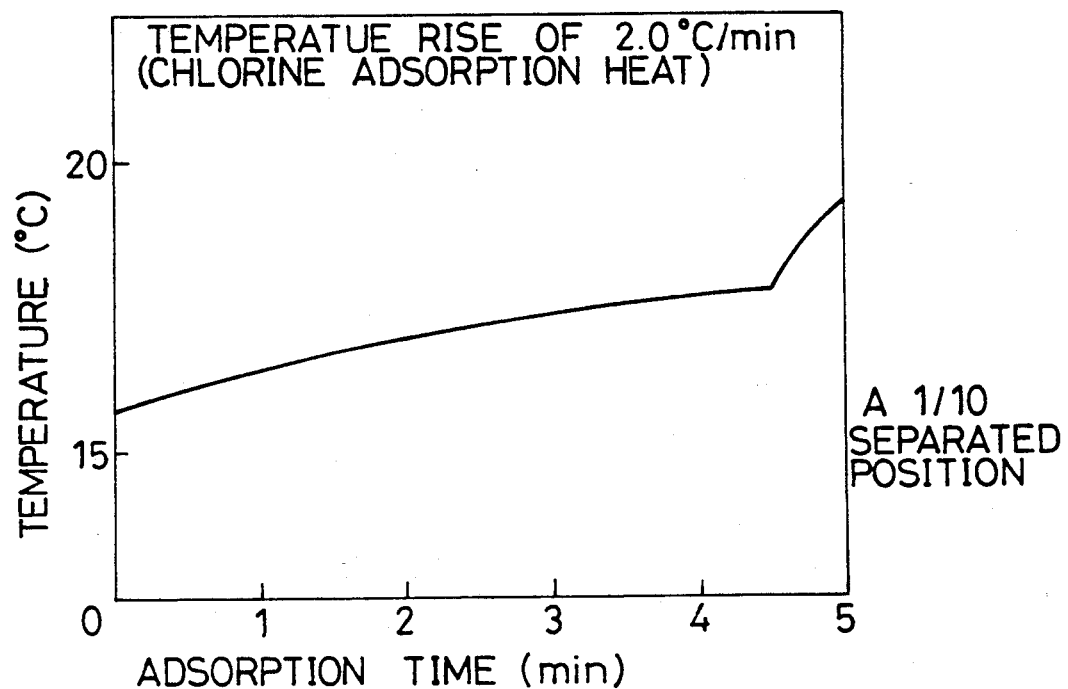
FIG. 3 is a graph showing the change time of the temperature rise of an adsorbent at positions separated as much as 1/10 and ⅓ of the total height of the adsorbent from the tip of the adsorbent at a gas outlet during an adsorbing operation under conditions in Table 1.
Figure 3:
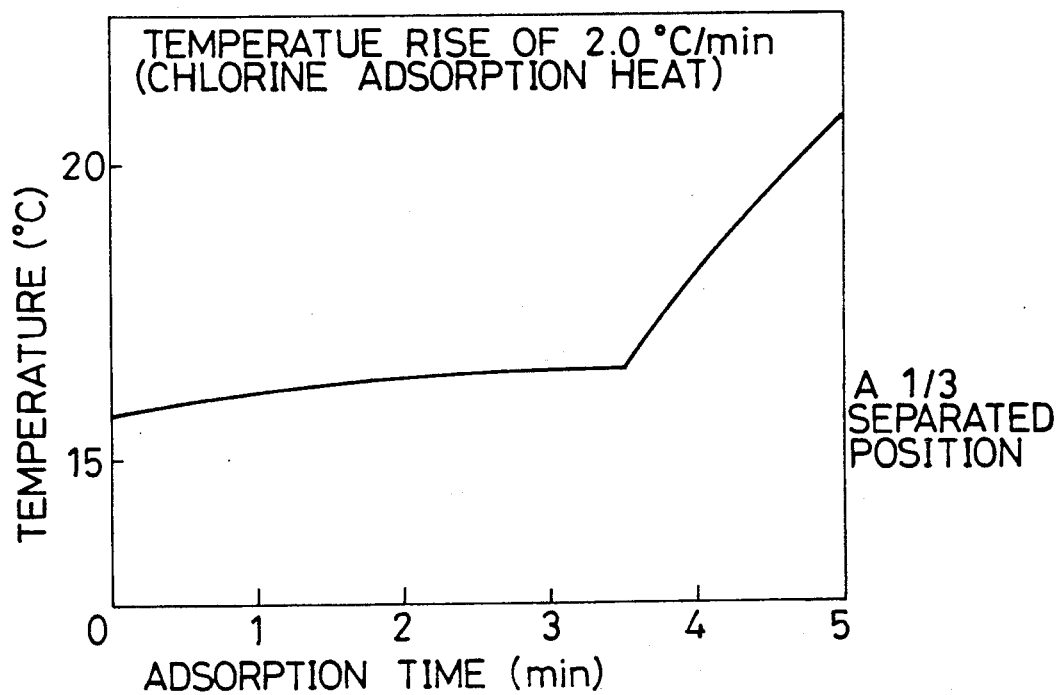

In order to obtain basic data necessary for the operation of the above-mentioned PSA apparatus, a temperature change of the adsorbent which occurs at the time of the adsorption of chlorine is measured. FIG. 3 shows temperature changes with time of the adsorbent at positions 1/10 and ⅓, respectively, of the total height of the column of packed adsorbent from the outlet end tip of the adsorbent tower of an adsorbing operation.

As a result, it has been confirmed that when the adsorption of chlorine is started, the temperature change of the adsorbent is a temperature rise of 2° C./minute, which is much larger as compared with a temperature change of 0.5° C./minute at the time of the passage (adsorption) of the other gas components of the material gas. This result is input into a computer, and programing is made so that the adsorbing operation might be stopped and the adsorbing tower might be switched, immediately when the temperature change of the adsorbent is 1.5° C. or more.

Operation is continuously carried out for 2 weeks under operating conditions shown in Table 1, with no chlorine detected in the residue gas detected during this period. The chlorine concentration in the concentrated gas is constant at a level of 60% by volume. In this connection, the chlorine concentrations in the concentrated gas and the remaining gas are determined by gas chromatography.

TABLE 1

| 1 | Adsorption Time | 5 minutes (when a differential temperature of 1.5° C./minute is detected, the adsorption is stopped) |
|---|---|---|
| 2 | Pressure Equalization Time | 1 minute (which is set by a fixed timer) |
| 3 | Desorption Time | 5 minutes (which is set by a fixed timer) |
| 4 | Pressure Equalization | 1 minute (which is set by a fixed timer) |

Temperature measurement position . . . A position separated as much as 1/10 of the total height of the adsorbent from the tip of the adsorbent at a gas outlet during an adsorbing operation.

| Adsorption Pressure: | 7 kg/cm$^2$ |
|---|---|
| Desorption Pressure: | 100 torr |
| Temperature of the treated gas at the inlet of the adsorbing tower: | 15° C. |

EXAMPLE 4

A PSA method for separating chlorine from a gas containing chlorine to concentrate chlorine is started under the same conditions as in Example 3, and a temperature of the treated gas at the inlet of an adsorption tower is changed from 15° C. to 40° C. during this experiment. When the temperature of the treated gas at the inlet of the adsorbing tower is raised, an adsorption time is shortened from 5 minutes of an initial value to 4 minutes 50 seconds, but chlorine in the residue gas is not detected, and the chlorine concentration in the concentrated gas is constant at a level of 60% by volume.

EXAMPLE 5

A PSA method for separating chlorine from a gas containing chlorine to concentrate the chlorine is started under the same conditions as in Example 3, and adsorption pressure is lowered from 7 kg/cm$^2$ to 3 kg/cm$^2$ during this experiment. In this case, an adsorption time is shortened from 5 minutes of an initial value to 4 minutes 20 seconds, but chlorine is not detected in the residue gas, and the concentration of a purified chlorine gas is 60% by volume.

EXAMPLE 6

A PSA method for separating chlorine from a gas containing chlorine to concentrate the chlorine therein is started under the same conditions as in Example 3, and the flow rate of the gas containing chlorine is changed from 2 Nm$^3$/h to 3 Nm$^3$/h. In this case, an adsorption time is shortened from 5 minutes of an initial value to 4 minutes 00 second. At this time, the chlorine concentration in the residue gas is several hundreds ppm. This would result from the fact that the linear velocity of the treated gas increases, and consequently the chlorine gas ascends to the upper portion of an adsorbing tower, while a differential value of 1.5° C./minute which is indicative of the temperature change which occurs in the adsorbent is detected. Thus, a temperature measurement position is changed to a position corresponding to 1/5 of the total height of the packed adsorbent from the tip of the adsorbent present a gas outlet during an adsorbing operation, and an experiment is similarly carried out. As a result, an adsorbing time is shortened from 5 minutes of an initial value to 4 minutes and 30 seconds, but chlorine is not detected in the residue gas. However, the concentration of the purified chlorine gas is 55% by volume.

EXAMPLE 7

FIG. 1 shows one example of a chlorine gas concentrating apparatus of the present invention.

A pipe 0 is a material gas introducing pipe, and a gas having a relatively low chlorine concentration and containing moisture is introduced into the pipe 0. Reference numeral 18 is a dehydrating tower, through which concentrated sulfuric acid is circulated by means of a pump 19. A pipe 20 is a feed pipe for fresh concentrated sulfuric acid, and a pipe 21 is a discharge pipe for relatively dilute sulfuric acid.

The gas containing moisture is fed to the dehydrating tower 18, in which moisture is removed therefrom, and the gas is then pressurized up to a predetermined pressure by a compressor 2. Afterward, the gas is introduced into a first tower 4a of the three adsorbing towers 4a, 4b and 4c via a switch valve 3. The three towers 4a, 4b and 4c are packed with an adsorbent such as a zeolite or active carbon for predominantly adsorbing chlorine, and chlorine in the material gas introduced in a pressurized state is predominantly adsorbed by the adsorbent.

At the outlet of adsorbing tower 4a, the gas scarcely containing chlorine is obtained, and this gas is then discharged through switch valve 7a. At this time, a part of the gas discharged from first tower 4a is introduced into second tower 4b via an adjusting mechanism 11 and a switch valve 10b, and a pressure filling step is then carried out to increase the pressure in this tower.

Furthermore, third tower 4c is connected with a vacuum pump 12 via switch valves 8c, 9b, and in third tower 4c, the concentrated chlorine gas is recovered and a desorbing step is carried out whereby the adsorbent in this tower is regenerated.

The introduction of material gas into the tower 4a in which a predetermined amount of chlorine has been adsorbed is stopped by switching a switch valve 3a, and a switch valve 8a is then switched. As a result, this tower is evacuated by the vacuum pump 12 to a reduced pressure state, so that chlorine adsorbed by the adsorbent is desorbed and consequently the adsorbent is regenerated.

In this desorbing step, the concentrated chlorine gas can be obtained as a product gas through the outlet of vacuum pump 12.

At this time, the material gas is introduced into second tower 4b via switch valve 3b, and in tower 4b, chlorine in the material gas is predominantly adsorbed. At the outlet of the adsorbing tower 4b, a gas scarcely containing chlorine is obtained and then discharged through a switch valve 7a.

Moreover, a part of the gas discharged through second tower 4b is introduced into third tower 4c via the pressure adjusting mechanism 11 and switch valve 10c, and a pressure filling step is then carried out to increase the pressure in this tower.

Afterward, the material gas is introduced into third tower 4c via a switch valve 3c, and in tower 4c chlorine in the material gas is predominantly adsorbed. At the outlet of the tower 4c, a gas scarcely containing chlorine is obtained and then discharged through switch valve 7c.

Simultaneously, a part of the gas discharged through third tower 4c is introduced into first tower 4a via pressure adjusting mechanism 11 and switch valve 10a, and a pressure filling step is then carried out to increase the pressure in this tower.

The introduction of material gas into the second tower 4b is stopped by switching switch valve 3b, and switch valve 8a is then switched. As a result, this tower is evacuated by vacuum pump 12 to a reduced pressure state, so that chlorine adsorbed by the adsorbent is desorbed and consequently the adsorbent is regenerated.

According to the system established by the present invention, this serial operation is afterward similarly repeated by the use of the three towers 4a, 4b and 4c, whereby chlorine can be continuously separated from the material gas containing chlorine and concentrated.

In this case, materials for equipments constituting this apparatus need not be expensive anti-corrosive materials, and relatively inexpensive materials may be acceptable.

As described above, according to the present invention, a chlorine gas containing impurities can be purified by the PSA method without leaking chlorine into an exhaust or residue gas, to obtain a high-purity chlorine product.

Furthermore, in the present invention, a temperature change of an adsorbent in the vicinity of the gas outlet in an adsorption tower is continuously measured, and when the differential value of this adsorbent temperature has reached a predetermined value, the introduction of the gas into the adsorbing tower is stopped and the desorbing operation of the adsorption tower is started, whereby even if gas treatment conditions fluctuate, the chlorine concentration in a remaining gas can always be maintained at substantially zero. The present invention thus is an industrially extremely effective control means.

In addition, the present invention can provide a relatively inexpensive apparatus which can separate chlorine from a gas containing chlorine and moisture to concentrate the chlorine therein.

What is claimed is:

1. A method for concentrating/purifying a feed chlorine gas containing impurities in a pressure swing adsorption-desorption system in which, in an adsorbing operation, the feed chlorine gas is fed to an adsorption tower packed with an adsorbent which adsorbs the chlorine gas, to produce an exhaust gas depleted of chlorine which is discharged from the tower, and in a subsequent desorbing operation, the chlorine gas adsorbed by the adsorbent in the tower is desorbed at a reduced pressure, whereby the feed chlorine gas is concentrated/purified and is then discharged from the tower in the desorbing operation and the regenerated adsorption tower is then used again in an adsorbing operation, which method comprises introducing the exhaust gas discharged from the adsorption tower during the adsorbing operation into a second adsorbing tower for carrying out the adsorbing operation, whereby the adsorbing operation is conducted sequentially in at least two steps in at least two adsorption towers, thereby producing a chlorine-free exhaust gas.

2. The method for concentrating/purifying a chlorine gas according to claim 1 wherein the adsorbing operation in an adsorption tower is terminated by terminating the flow of feed chlorine gas thereto and thereafter, prior to the start of the desorbing operation in that adsorption tower, concentrated high-purity chlorine gas is introduced into the adsorbing tower thereby displacing non-adsorbed chlorine gas containing impurities in the tower with the concentrated high-purity chlorine gas.

3. The method for concentrating/purifying a chlorine gas according to claim 1 wherein the gaseous impurity contained in the feed chlorine gas is oxygen.

4. The method for concentrating/purifying a chlorine gas according to claim 1 wherein the adsorption state of the adsorbent in the adsorption tower receiving the feed chlorine gas is detected by a sensor for detecting the presence of the chlorine gas in the exhaust gas discharged from the tower and wherein the feeding of the feed chlorine gas containing impurities to the adsorbing tower is stopped when chlorine gas is detected in the exhaust gas discharged from the tower and the adsorbing operation in then changed to the desorbing operation in that tower.

5. The method for concentrating/purifying a chlorine gas according to claim 4 wherein the sensor is a thermometer adapted to detect a rise in temperature in the tower caused by the adsorption of chlorine gas on the adsorbent in the tower.

6. The method for concentrating/purifying a chlorine gas according to claim 5 wherein the temperature rise of the adsorbing tower during the adsorbing operation is detected by the sensor at a position in the tower which is spaced from the point where the treated exhaust gas is discharged therefrom which is $\frac{1}{2}$ or less of the total height of the adsorbent in the tower.

7. The method for concentrating/purifying a chlorine gas according to claim 1 wherein the adsorbent for adsorbing the chlorine gas is one selected from the group consisting of zeolites, non-zeolite type porous acidic oxides, active carbon and molecular sieve carbon.

8. The method for concentrating/purifying a chlorine gas according to claim 7 wherein the adsorbent for adsorbing the chlorine gas is a Y type zeolite.

9. An apparatus for concentrating/purifying a feed chlorine gas containing gaseous impurities in a pressure swing adsorption system comprising a plurality of adsorption towers into which in an adsorbing operation the feed chlorine gas is fed to a plurality of adsorption towers packed with an adsorbent adapted for adsorbing the chlorine gas, thereby producing an exhaust gas depleted in chlorine gas, and from which, in a desorbing operation, the adsorbent is desorbed therefrom, thereby concentrating/purifying the feed chlorine gas to a high purity; connecting means for feeding during an adsorption operation the exhaust gas depleted in chlorine gas discharged from one of the plurality of adsorption towers to another of the adsorption towers, whereby the adsorbing operation occurs in at least two stages in at least two adsorption towers and the chlorine gas concentration in the exhaust gas discharged from the apparatus is reduced to substantially zero.

10. The apparatus for concentrating/purifying a chlorine gas according to claim 9, wherein the connecting means comprising switching means for recycling concentrated high-purity chlorine gas exiting from an adsorption tower back to an adsorption tower in which an adsorbing operation has been completed, to displace non-adsorbed chlorine gas containing impurities in the adsorption tower with the concentrated high-purity chlorine gas.

11. The apparatus for concentrating/purifying a chlorine gas containing impurities according to claim 9 which comprises:
(a) for each of the plurality of adsorption towers an inlet for receiving the gas to be treated and an outlet for discharging the treated exhaust gas,
(b) for each of the plurality of adsorption towers, a first pipe connected to the inlet for directing the gas to be treated to the adsorption tower, a second pipe connected to the outlet for receiving the treated exhaust gas from the adsorption tower, a third pipe connected to the inlet for discharging the concentrated chlorine gas from the adsorption tower during a desorption operation, a fourth pipe connecting the outlet of one adsorption tower with the inlet of another adsorption tower, and a fifth pipe connecting an inlet with an exhaust vent of a product gas tank or with a compressor for a concentrated/purified chlorine gas for flushing feed chlorine gas containing impurities from an adsorption tower with pure chlorine product prior to a desorbing operation.
(c) a switch valve for switching the connections of these pipes so that at any time the gas which flows therethrough can be changed,
(d) a vacuum pump for reducing the pressure in the system during a desorbing operation,
(e) a product tank for receiving and maintaining constant the pressure of the concentrated/purified chlorine gas, and
(f) a compressor for raising the pressure of the concentrated/purified chlorine gas.

12. The apparatus for concentrating/purifying a chlorine gas according to claim 9 which comprises sensor means for detecting the presence of chlorine gas by detecting a temperature rise produced by the adsorption of chlorine gas by adsorbent which is proximate the sensor and which is disposed in the upper portion of an adsorbent-packed layer in the adsorption tower, whereby the completion of the adsorbing operation of the adsorbent-packed layer during the adsorbing operation is detected, and switching means responsive to the detection by the sensor means of chlorine gas for terminating the feed of the chlorine gas containing impurities to the adsorption feed of the chlorine gas containing impurities to the adsorption tower and for changing the adsorbing operation in the adsorption tower to the desorbing operation.

13. The apparatus for concentrating/purifying a chlorine gas according to claim 12 wherein the sensor means for detecting the presence of the chlorine gas is a thermometer.

14. The apparatus for concentrating/purifying a chlorine gas according to claim 13 which comprises:
(a) for each of the plurality of adsorption towers an inlet for receiving the gas to be treated, an outlet for discharging the treated exhaust gas,
(b) for each of the plurality of adsorption towers, a first pipe connected to an inlet for directing the gas to be treated to the adsorption tower, a second pipe connected to the outlet for receiving the treated exhaust gas from the adsorption tower, a third pipe connected to the inlet for discharging the concentrated chlorine gas from the adsorption tower during a desorption operation, a fourth pipe connecting the outlet of one adsorption tower with the inlet of another adsorption tower, and a fifth pipe connecting an inlet with an exhaust vent of a product gas tank or with a compressor for a concentrated/purified chlorine gas,
(c) a switch valve for switching the connections of these pipes so that at any time the gas which flows therethrough can be changed,
(d) a vacuum pump for reducing the pressure in the system during a desorbing operation,
(e) a detector for detecting the temperature rise of the adsorbent-packed layer in each adsorption tower during the adsorbing operation, and
(f) a switching mechanism whereby a switch valve is activated so as to stop the introduction of the feed chlorine gas into an adsorption tower when a temperature rise occurs therein proximate the sensor means in excess of a predetermined value.

15. The apparatus for concentrating/purifying a chlorine gas according to claim 14 wherein the predetermined value of the temperature rise is 1.5° C. per minute.

16. The apparatus for concentrating/purifying a chlorine gas according to claim 13 wherein the predetermined value of the temperature rise is 1.5° C. per minute.

17. The apparatus for concentrating/purifying a chlorine gas according to claim 12 wherein the sensor means is positioned at a distance of up to ⅓ of the total height of the adsorbent in the adsorbent tower from the treated exhaust gas outlet of the adsorbent tower.

18. The apparatus for concentrating/purifying a chlorine gas according to claim 12 wherein the sensor means terminates the adsorbing operation when a rate of temperature rise reaches a predetermined value of 1.5° C. per minute.

* * * * *